United States Patent [19]

Horn et al.

[11] Patent Number: 4,714,718
[45] Date of Patent: Dec. 22, 1987

[54] NYLON MOLDINGS AND THEIR PRODUCTION

[75] Inventors: Peter Horn, Heidelberg; Edwin Baumann, Schifferstadt; Matthias Marx, Bad Duerkheim, all of Fed. Rep. of Germany

[73] Assignee: BASF Aktiengesellschaft, Ludwigshafen, Fed. Rep. of Germany

[21] Appl. No.: 782,926

[22] Filed: Oct. 2, 1985

[30] Foreign Application Priority Data

Oct. 4, 1984 [DE] Fed. Rep. of Germany ....... 3436359

[51] Int. Cl.$^4$ ............................................. C08L 77/00
[52] U.S. Cl. .................................... 521/134; 521/138; 525/432
[58] Field of Search ................. 525/432; 521/138, 134

[56] References Cited

U.S. PATENT DOCUMENTS

| 4,026,834 | 5/1977 | Cordes et al. | 521/183 |
| 4,031,164 | 6/1977 | Hedrick et al. | 260/857 |
| 4,297,454 | 10/1981 | Thompson | 525/432 |
| 4,464,491 | 8/1984 | Kosa | 521/134 |
| 4,593,076 | 6/1986 | Russo et al. | 525/425 |

FOREIGN PATENT DOCUMENTS 0067694 12/1982 European Pat. Off. .
99058 7/1983 European Pat. Off. .

*Primary Examiner*—Wilbert J. Briggs, Sr.
*Assistant Examiner*—A. Carrillo
*Attorney, Agent, or Firm*—Keil & Weinkauf

[57] ABSTRACT

Nylon moldings which may or may not be cellular and have improved performance characteristics are obtained by activated alkaline polymerization of caprolactam in the presence of an amorphous or partially crystalline polycondensate which has a solubility of not less than 5% by weight in caprolactam at 120° C.

7 Claims, No Drawings

NYLON MOLDINGS AND THEIR PRODUCTION

The present invention relats to nylon moldings which may or may not be cellular, are produced by activated anionic lactam polymerization and possess improved performance characteristics, ie. a high modulus of elasticity, high impact strength, good low-temperature impact strength, high heat distortion resistance, good light stability and low water absorption, have a surface faithful to the mold and are very substantially shrink-free.

Nylons prepared by activated alkaline lactam polymerization have been known for more than 30 years but have not assumed any great importance to date. In particular, it has been impossible hitherto to produce sheet-like components possessing good performance characteristics. The moldings exhibit very pronounced shrinkage during production, the (low temperature) impact strength is insufficient, high water absorption results in a sharp fall in the modulus of elasticity, the heat distortion resistance and the light stability are unsatisfactory, and the surface exhibits defects and areas of shrinkage.

There has been no lack of attempts to overcome these disadvantages. For example, DE-A No. 24 12 106 describes the addition of certain block polymers for increasing the low-temperature impact strength. However, this simultaneously reduces the modulus of elasticity, and the moldings furthermore exhibit pronounced shrinkage during production. Although the additives described in DE-A No. 32 25 137 reduce the volume shrinkage dramatically, they have an adverse effect on mechanical properties such as rigidity and impact strength. We have found, surprisingly, that the above disadvantages of the prior art can be overcome by adding certain polycondensates which are soluble in caprolactam. We have furthermore found that the process according to the invention can be used to produce moldings without an external or internal release agent and in extremely short cycle times.

The present invention therefore relates to nylon moldings which may or may not be cellular and which contain (A) 70–99 parts by weight of polycaprolactam and
(B) 1–30 parts by weight of a polycondensate
which is amorphous or contains less than 30% of crystalline components, and has a solubility of not less than 5% by weight in caprolactam at 120° C., and may contain
(c) not more than 100 parts by weight of glass fibers and/or other fillers and/or sheet-like reinforcing materials and/or
(D) effective amounts of conventional assistants.

The present invention furthermore relates to a process for the production of these nylon moldings, wherein a solution of the polycondensate (B) in liquid caprolactam is subjected to activated alkaline polymerization in a conventional manner in a mold, in the presence or absence of the fillers (C) and/or conventional assistants.

The essential feature of the invention is that the conventional production of nylon moldings by activated alkaline lactam polymerization is carried out in the presence of 1–30 parts of a polycondensate (B) per 70–99 parts of caprolactam (A), the sum of A and B being 100 parts. The polycondensates are either amorphous or partially crystalline, and the crystalline fraction should not exceed 30%. The polycondensates must be soluble in liquid caprolactam. The solubility at the processing temperature should be sufficiently high for the amount used to dissolve completely, ie. the solubility in caprolactam at 120° C. must be no less than 5% by weight. Examples of polycondensates which satisfy this condition are nylons, in particular those having a K value (0.5% strength in 1:1 phenol/o-dichlorobenzene) of from 30 to 75, and especially aliphatic polyamides having a melting point below 200° C. or aromatic/aliphatic polyamides having a glass transition temperature of about 100°–170° C. Very useful nylons are those obtained from 20–60% by weight of a cyclic lactam of 6 to 12 carbon atoms and/or $\omega$-aminocarboxylic acids of 6 to 20 carbon atoms and 40–80% by weight of salts of aliphatic, cycloaliphatic or aromatic dicarboxylic acids of 6 to 14 carbon atoms and/or dimeric fatty acids of about 36 carbon atoms with aliphatic, cycloaliphatic or araliphatic diamines of 4 to 20 carbon atoms and/or polyetherdiamines having molecular weights of from 500 to 5,000.

Examples of these are nylons composed of 20–60% by weight of caprolactam, caprylolactam, laurolactam, enantholactam and $\alpha$-methylcaprolactam and/or $\omega$-aminocaproic acid or $\omega$-aminoundecanoic acid and 40–80% by weight of salts of succinic acid, glutaric acid, adipic acid, sebacic acid, decanedicarboxylic acid, dimeric fatty acids which, as industrial products, may also contain as much as 25% by weight of trimerized fatty acids, cyclohexanedicarboxylic acid, terephthalic acid, isophthalic acid and/or naphthalenedicarboxylic acid with tetramethylenediamine, pentamethylenediamine, hexamethylenediamine, octamethylenediamine, nonamethylenediamine, decamethylenediamine, isophoronediamine, piperazine, 2,2,4- or 2,4,4-trimethylhexamethylenediamine, 4,4'-diaminodicyclohexylmethane, 3,3'-dimethyl-4,4'-diaminodicyclohexylmethane, 2,2-bis-(4-aminocyclohexyl)-propane, 1,4-di-(aminomethyl)-cyclohexane, 4,9-dioxadodecane-1,2-diamine, m-xylylenediamine, p-xylylenediamine, aminoethylpiperazine, diethylenetriamine, bishexamethylenetriamine and/or a polymer diamine of the formula $H_2N-(CH_2-CHR-O)_n-CH_2-CHR-NH_2$, where R is hydrogen or methyl, having a molecular weight of from 500 to 5,000.

Other examples of suitable polycondensates are nylons obtained from one or more aliphatic dicarboxylic acids of 4 to 12 carbon atoms and/or aromatic dicarboxylic acids of 8 to 12 carbon atoms and one or more aliphatic or cycloaliphatic or araliphatic diamines of 4 to 20 carbon atoms and/or polyether diamines having molecular weights of from 500 to 5,000. Examples of these are nylons obtained from succinic acid, glutaric acid, adipic acid, suberic acid, sebacic acid, decanedicarboxylic acid, terephthalic acid and/or isophthalic acid and tetramethylenediamine, pentamethylenediamine, hexamethylenediamine, octamethylenediamine, decamethylenediamine, 2,2,4- or 2,4,4-trimethylhexamethylenediamine, 4,4'-diaminodicyclohexylmethane, 3,3'-dimethyl-4,4'-diaminodicyclohexylmethane, 2,2-bis-(4-aminocyclohexyl)-propane, 1,4-di-(aminomethyl)cyclohexane, 4,9-dioxadodecane-1,12-diamine, m-xylylenediamine, p-xylylenediamine, diethylenetriamine, bis-hexamethylenetriamine, isophoronediamine, piperazine, 1-(2-aminoethyl)-piperazine or 4'-(2-aminoethyl)piperidine.

Particularly advantageous are nylons obtained from 25–40% by weight of caprolactam and 60–75% by weight of an equimolar mixture of dimeric fatty acids (for example industrial products having acid numbers of 188-198), if appropriate as a mixture with other aliphatic dicarboxylic acids, such as adipic acid, and aliphatic diamines, in particular hexamethylenediamine.

Further useful polycondensates are (co)polyesters of one or more aromatic dicarboxylic acids of 8 to 20 carbon atoms and one or more aliphatic diols of 2 to 12 carbon atoms and/or a polyether diol having a molecular weight of from 200 to 5,000. Examples of these are polyesters obtained from phthalic acid, isophalic acid and/or terephthalic acid and ethylene glycol, propylene glycol, butane-1,4-diol, hexane-1,6-diol, polyethylene glycol, polypropylene glycol or polytetrahydrofuran.

In the molding, the polycondensates are present in the free form but may furthermore be completely or partly chemically bonded to the polycaprolactam, fior example via urea, urethane and/or amide groups. Bonding of this type takes place as a rule when the polycondensate possesses terminal groups which act as an activator for the anionic lactam polymerization, or when the terminal polycondensate groups react with the activator used. For example, molecular bonding between the nylons and the polycaprolactam takes place if the terminal groups of the nylon are reacted with lactamates, acryloylcaprolactam or a diisocyanate. An advantageously used diisocyanate is industrial toluylene diisocyanate or 4,4'-diphenylmethane diisocyanate.

The polycondensates used are known substances and are prepared in a conventional manner by melt condensation. It is also possible to increase the shelf life of the solutions of the polycondensates in liquid caprolactam, to improve the mechanical properties of the moldings and to reduce the cycle time by masking the terminal functional groups of the polycondensates in a conventional manner, for example by esterifying the free carboxyl groups and the free hydroxyl groups and acylating the free amino groups. For example, the carboxyl groups can be masked by reaction with primary alcohols, orthoformates, dimethylformamide acetals or glyoxylic acid nitrile acetals, the free amino groups can be masked by reaction with isocyanates, acryloylcaprolactam or methacryloylcaprolactam or with lactamates or other conventional acylating agents, and the hydroxyl groups can be masked by reaction with acetyl chloride, benzoyl chloride or acetic anhydride. Masking of the terminal groups of the polycondensates may be carried out in caprolactam as a solvent, and the resulting by-products may be removed by distillation. Dimethylformamide acetals are useful for masking both the amino groups and the carboxyl groups, and the same applies to alkyl lactam-N-carboxylates. The effect of masking is to bond the polycondensate chemically to the polycaprolactam matrix. An essential component of the novel moldings is polycaprolactam. As a result of the activated alkaline polymerization process, the polymer has a relatively high molecular weight and in general possesses a relative viscosity of from 2.0 to 50, in particular from 7.5 to 22, measured on a 1% strength solution.

A homopolymer of caprolactam is preferably used, although copolymers of caprolactam which contain, for example, as much as 15 mol% of other lactams, such as caprylolactam, laurolactam or enantholactam, or other copolymerizable monomers as copolymerized units, or which have been modified with polyether polyols, isocyanate prepolymers or bisacyllactams, are also suitable.

The moldings can, if required, contain as much as 100 parts by weight, based on 100 parts by weight of A and B, of conventional, reinforcing or non-reinforcing fillers, such as glass fibers, carbon fibers or fibers of aromatic polyamides. Short fibers having a length of from 0.1 to 3 mm may be present, as well as longer fibers and even continuous filaments, fiber mats, woven fabrics, webs, rovings and fiber bundles. Other suitable fillers are finely divided silicates, such as wollastonite, talc, chalk, molybdenum sulfide and carbon black.

The moldings can, if required, also contain effective amounts of conventional assistants, such as catalysts, activators, regulators, pigments, dyes, plasiticizers and flameproofing agents.

The novel nylon moldings may contain from 3 to 100% by volume, based on (A) and (B), of gas-filled cells having a mean diameter of less than 0.2 mm. The outer skin is very substantially cell-free in the range of from about 1 to 100 μm.

By means of finely dispersed gas, it is possible to produce a fine-cell caprolactam foam which gives a fine-cell molding during polymerization. Surprisingly, the molding shrinks only to an insignificant extent, if at all, since the volume contraction during conversion of caprolactam to polycaprolactam is compensated by a corresponding increase in the size of the cells of the foam.

Moldings containing as much as 30% by volume of cells possess particularly high mechanical strength. Advantageously, the mean diameter of the cells is from 0.001 to 0.15 mm, in particular from 0.01 to 0.1 mm.

With the exception of the cell-free skin, the cells in the molding are generally distributed in a substantially uniform manner, although it is also possible to produce moldings which have a plurality of zones of different density, in which the volume occupied by gas cells changes continuously or abruptly.

The cells may contain any gases which are inert to caprolactam, eg. helium, argon, ethane, propene, difluorodichloromethane, tetrafluoromethane, hexamethylenedisilane, etc. Nitrogen is preferably used.

The novel moldings can be produced by the conventional process of activated anionic lactam polymerization, as described in, for example, Kunststoff-Handbuch, Vol. VI, Polyamide, Carl Hanser Verlag, 1966, pages 46-59.

This process starts from two components, one of these being a catalyst-containing lactam melt while the other is an activator-containing lactam melt. The two components are mixed, transported into a mold and polymerized there.

Examples of suitable catalysts are alkali metal and alkaline earth metal compounds of lactams, such as sodium ε-caprolactamate, or of short-chain aliphatic carboxylic acids, such as sodium formate or potassium formate, or of alcohols of 1 to 6 carbon atoms, such as sodium methylate or potassium tert.-butylate. It is also possible to use alkali metal or alkaline earth metal hydrides, hydroxides or carbonates as well as Grignard compounds. A mixture of sodium ε-caprolactamate and aluminum ε-caprolactamate, for example in a weight ratio from 2:1 to 1:2, is also very useful. The catalysts are usually employed in amounts of from 0.1 to 10 mol%, based on total lactam.

Suitable activators are N-acyllactams, such as N-acetylcaprolactam, bisacyllactams, substituted triazines, carbodiimides, ketenes, cyanamides, mono- and polyisocyanates and masked isocyanate compounds. They are preferably employed in amounts of from 0.1 to 10 mol%, based on total lactam.

In order to obtain partially crosslinked low-shrinkage products, it is advantageous concomitantly to use a trifunctional or polyfunctional activator, for example in an amount of 5-20 mol%, based on the total amount of activator. Examples of suitable crosslinking agents are triisocyanates, as obtainable by trimerization of aliphatic diisocyanates.

In the process for the production of moldings having fine gas cells, it is important that, for the activated anionic polymerization, the caprolactam is present as an intimate mixture with a gas which is inert to caprolactam, the cells of this mixture having a mean diameter of less than 0.2 mm. The amount of gas required depends primarily on the percentage by volume of gas cells which the molding is intended to possess, and can be readily determined in an individual case by means of a preliminary experiment.

The gas is introduced by mixing it thoroughly with the liquid caprolactam, advantageously under from 1.5 to 30 bar. In practice, it may be mixed with the catalyst-containing melt, with the activator-containing melt or with both melts.

As in the conversion of cream to whipped cream, the apparent viscosity generally changes by a factor of from 1.1 to 10 in the transition from caprolactam to caprolactam foam. Consequently, less turbulence occurs when the mold is filled, and the inclusion of large air bubbles in the molding, a phenomenon which is frequently observed, is reduced to a minimum.

To produce the caprolactam/gas foam, for example, the liquid caprolactam can be saturated with the gas under superatmospheric pressure, and the pressure then let down. In order to obtain the desired fine-cell foam in this method simply by letting down the pressure, it is advantageous to use an emulsifier too. The latter must be soluble in the caprolactam melt and must not possess any groups which have an adverse effect on the caprolactam polymerization. Examples of suitable emulsifiers are the commercial silicones used for polyurethane foams, eg. polysiloxane/polyether copolymers, as well as conventional polyethers based on ethylene oxide and/or propylene oxide, and soluble polymers which contain grafted polyether groups. Emulsifiers of this type are also useful for reducing the time and intensity required for mixing caprolactam with the gas to achieve the desired foam structure. The emulsifier is used in general in an amount of from 0.01 to 5, preferably from 1 to 3, % by weight, based on caprolactam.

Preferred emulsifiers are those which contain more than 15, in particular from 20 to 50, % by weight of polyether groups with terminal OH, O-alkyl or O-acyl groups.

In practice, it is advantageous to employ a conventional reaction injection molding (RIM) technique, as described for polyurethanes in Piechota and Röhr, Integralschaumstoffe, Carl Hanser Verlag, 1975, pages 34-37.

The two components, lactam+catalyst and lactam+activator (component B being in solution in the lactam), are heated to above the melting point, preferably from 80° to 140° C., in separate kettles, and are transported by means of heated pumps through heated pipes to a mixing head which is likewise heated.

To fill the mold, the plunger of the mixing head is drawn back, the two precisely metered components enter the open mixing chamber, where relevant together with the intended amount of gas, and are mixed thoroughly there, any gas cells present possessing a mean diameter of less than 0.2 mm, and the mixture is then introduced into the mold, which is advantageously heated at from 120° to 180° C., preferably from 125° to 160° C. The molding can be removed from the mold after only 1-2 minutes. The polycaprolactam generally has a high molecular weight and a K value greater than 100, in many cases from 110 to 160. The content of monomers and oligomers is in general less than 3%.

In the Examples which follow, parts are by weight.

EXAMPLE 1

A mixture I comprising
40 parts of a 12.5% strength solution of a nylon, consisting of 50 parts of caprolactam and 50 parts of an adipic acid/hexamethylenediamine salt and having a K value of 73.5, in caprolactam,
9 parts of a 17.5% strength solution of sodium lactamate in caprolactam and
1 part of a polyether consisting of allyl alcohol/propylene oxide (PO)/ethylene oxide (EO) and having a molecular weight of 6,000, and
a mixture II comprising
41.5 parts of a 12.2% strength solution of a nylon copolymer, consisting of 50 parts of caprolactam and 50 parts of an adipic acid/hexamethylenediamine salt and having a K value of 73.5, in caprolactam,
8.5 parts of a solution of 83.5% of caprolactam and 16.5% of hexamethylene diisocyanate and
1 part of a polyether consisting of allyl alcohol/PO/EO and having a molecular weight of 6,000
were laden with nitrogen under an initial pressure of 5 bar, fed to the mixing chamber at 125° C. and directly thereafter introduced into a closed sheet mold. The mold temperature was 149° C. The sheet was removed from the mold after 1.5 minutes.

The sheet obtained had a smooth, shrink-free surface and the following mechanical properties:
density: 1.078 g/cm$^3$
pore volume: 5%
mean cell diameter: 0.05 mm
yield stress [N/mm$^2$], DIN 53,504: 75
tensile strength [N/mm$^2$], DIN 53,504: 70
elongation at break [%], DIN 53,504: 24
Shore D hardness, DIN 53,505: 80
flexural stress at maximum deflection [N/mm$^2$], DIN 53,452: 68
notched impact strength [DIN 53,753]
at +23° C.: 16 kJ/m$^2$
−40° C.: 5 kJ/m$^2$
flexural modulus of elasticity [N/mm$^2$], DIN 53,457: 2,900
heat distortion resistance ISO 75$_B$ [°C.]: 204

EXAMPLE 2

Sheets were produced as described in Example 1.
Mixture I comprised
40 parts of a 12.5% strength solution of a nylon, consisting of 40 parts of caprolactam and 60 parts of an adipic acid/hexamethylenediamine salt and having a K value of 76.6, in caprolactam,
9 parts of a 17.5% strength solution of sodium lactamate in caprolactam and
1 part of a polyether consisting of allyl alcohol/PO/EO and having a molecular weight of 6,000, and mixture II comprised 41.5 parts of a 12.2% strength solution of a nylon, consisting of 40 parts of caprolactam and 60 parts of an adipic acid/hexamethylenediamine salt and having a K value of 74.6, in caprolactam, 8.5 parts of a 17.5% strength solution of hexamethylene diisocyanate in caprolactam and 1 part of a polyether consisting of allyl alcohol/PO/EO and having a molecular weight of 6,000.

Mixing temperature: 125° C.
Molding temperature: 149° C.
Molding time: 1.5 minutes
Initial pressure: 5 bar nitrogen A sheet having a smooth surface was obtained.
Mechanical properties:
density: 1.069 g/cm$^3$
pore volume: 6%
mean cell diameter: 0.04 mm
yield stress [N/mm$^2$], DIN 53,504: 81
tensile strength [N/mm$^2$], DIN 53,504: 65
elongation at break [%], DIN 53,504: 5
Shore D hardness, DIN 53,505: 80
flexural stress at maximum deflection [N/mm$^2$], DIN 53,452: 65
noched impact strength [DIN 53,753]
  at °23° C.: 15 kJ/m$^2$
  at −40° C.: 6 kJ/m$^2$
flexural modulus of elasticity [N/mm$^2$], DIN 53,457: 2,880
heat distortion resistance ISO 75$_B$ [°C.]: 203

EXAMPLE 3

Sheets were produced as described in Example 1.
Mixture I comprised 40 parts of a 12.5% strength solution of a nylon, consisting of 33⅓ parts of caprolactam, 33⅓ parts of an adipic acid/hexamethylenediamine salt and 33⅓ parts of an adipic acid/4,4-diaminodicyclohexylmethane salt and having a K value of 71.6, 9 parts of a 17.5% strength solution of sodium lactamate in caprolactam and 1 part of a polyether consisting of allyl alcohol/PO/EO and having a molecular weight of 6,000, and mixture II comprised 41 parts of a 12.2% strength solution of a nylon, consisting of 33⅓ parts of an adipic acid/hexamethylenediamine salt, 33⅓ parts of an adipic acid/4,4'-diaminodicyclohexylmethane salt and 33⅓ parts of caprolactam and having a K value of 71.6, in caprolactam, 8.5 parts of a 17.5% strength solution of hexamethylene diisocyanate in caprolactam and 0.5 part of a polyether consisting of allyl alcohol/PO/EO and having a molecular weight of 6,000.

Mixing temperature: 125° C.
Molding temperature: 143° C.
Molding time: 2 minutes
Initial pressure: 5 bar nitrogen.

A sheet having a smooth surface was obtained.
density: 1.078 g/cm$^3$
pore volume: 5%
mean cell diameter: 0.05 mm
yield stress [N/mm$^2$], DIN 53,504: 80
tensile strength [N/mm$^2$], DIN 53,504: 65
elongation at break [%], DIN 53,504: 6
Shore D hardness, DIN 53,505: 79
flexural stress at maximum deflection [N/mm$^2$], DIN 53,452: 68
notched impact strength [DIN 53,753]
  at +23° C.: 14 kJ/m$^2$
  at −40° C.: 7 kJ/m$^2$
flexural modulus of elasticity [N/mm$^2$], DIN 53,457: 2,950
heat distortion resistance ISO 75$_B$ [°C.]: 201

EXAMPLE 4

Sheets were produced as described in Example 1.
Mixture I comprised 40 parts of a 12.5% strength solution of a nylon, consisting of terephthalic acid and 2,2,4-trimethylhexamethylenediamine and having a K value of 68.5, in caprolactam, 9 parts of a 17.5% strength solution of sodium lactamate in caprolactam and 0.5 part of a polyether consisting of PO (16.3%)/EO (83.7%) with n-propanol as an initiator (molecular weight 4,000) and 1 part of talc, and mixture II comprised 39.9 parts of a 12.5% strength solution of a nylon, consisting of terephthalic acid and 2,4,4-trimethylhexamethylenediamine and having a K value of 68.5, in caprolactam, 8.5 parts of a 17.5% strength solution of hexamethylene diisocyanate in caprolactam, 1 part of talc, 0.5 part of a polyether consisting of PO (16.3%)/EO (83.7%) with n-propanol as an initiator (molecular weight 4,000), 0.1 part of Cu(I)I/KI (molar ratio 1:3) and 0.002 part of manganese(II) hypophosphite.

Mixing temperature: 120° C.
Molding temperature: 149° C.
Molding time: 2 minutes
Initial pressure: 5 bar nitrogen.

A sheet having a smooth surface was obtained.
Mechanical properties:
density: 1.066 g/cm$^3$
pore volume: 6.5%
mean cell diameter: 0.03 mm
yield stress [N/mm$^2$], DIN 53,504: 75
tensile strength [N/mm$^2$], DIN 53,504: 67
elongation at break [%], DIN 53,504: 6
Shore D hardness, DIN 53,505: 79
flexural stress at maximum deflection [N/mm$^2$], DIN 53,452: 68
notched impact strength [DIN 53,753]
  at +23° C.: 22.5 kJ/m$^2$
  at −40° C.: 6.2 kJ/m$^2$
flexural modulus of elasticity [N/mm$^2$], DIN 53,457: 3,030
heat distortion resistance ISO 75$_B$ [°C.]: 193

EXAMPLE 5

Sheets were produced as described in Example 1.
Mixture I comprised 40 parts of a 12.5% strength solution of a nylon, prepared from 40 parts of an adipic acid/hexamethylenediamine salt and 60 parts of an isophthalic acid/3,3'-dimethyl-4,4'-diaminodicyclohexylmethane salt and having a K value of 60, in caprolactam, 9 parts of a 17.5% strength solution of sodium lactamate in caprolactam, 0.5 part of a polyether consisting of PO (16.3%)/EO (83,7%) with n-propanol as an initiator (molecular weight 4,000) and 1 part of talc, and mixture II comprised 40 parts of a 12.5% strength solution of a nylon, consisting of 40 parts of an adipic acid/hexamethylenediamine salt and 60 parts of an isophthalic acid/3,3'-dimethyl-4,4'-diaminodicyclohexylmethane salt and having a K value of 60, in caprolactam, 8.5 parts of a 17.5% strength solution of hexamethylene diisocyanate in caprolactam, 1 part of talc and 0.5 part of a polyether consisting of PO (16.3%)/EO (83.7%) with n-propanol as an initiator (molecular weight 4,000).

Mixing temperature: 120° C.
Molding temperature: 147° C.
Molding time: 2 minutes
Initial pressure: 5 bar nitrogen.

A sheet having a smooth surface was obtained.
density: 1.07 g/cm$^3$
pore volume: 8%
mean cell diameter: 0.02 mm
yield stress [N/mm$^2$], DIN 53,504: 68
tensile strength [N/mm$^2$], DIN 53,504: 70
elongation at break [%], DIN 53,504: 8
Shore hardness, DIN 53,505: 80
flexural stress at maximum deflection [N/mm$^2$], DIN 53,452: 68
notched impact strength [DIN 53,753]
  at +23° C.: 23 kJ/m$^2$
  at −40° C.: 8 kJ/m$^2$
flexural modulus of elasticity [N/mm$^2$], DIN 53,457: 3,000
heat distortion resistance ISO 75$_B$ [°C.]: 195

EXAMPLE 6

Production of a glass mat-reinforced molding. Before the mold-filling operation described in Example 1, 3 glass mats having a weight by unit area of 450 g/m$^2$ were placed in the mold.

Mixture I comprised 39.5 parts of a 9.5% strength solution of a nylon, consisting of 33⅓ parts of caprolactam, 33⅓ parts of an adipic acid/hexamethylenediamine salt and 33⅓ parts of an adipic acid/4,4'-diaminodicyclohexylmethane salt and having a K value of 71.6, 9 parts of a 17.5% strength solution of sodium lactamate in caprolactam, 1 part of talc and 0.5 part of a polyether consisting of PO (16.3%)/EO (83.7%) with n-propanol as an initiator (molecular weight 4,000), and mixture II comprised 39.9 parts of a 9.4% strength solution of a nylon, consisting of 33⅓ parts of caprolactam, 33⅓ parts of an adipic acid/hexamethylenediamine salt and 33⅓ parts of an adipic acid/4,4'-diaminodicyclohexylmethane salt and having a K value of 71.6, 8.5 parts of a 17.5% strength solution of hexamethylene diisocyanate in caprolactam, 1 part of talc and 0.1 part of Cu(I)I/KI (molar ratio 1:3).

Mixing temperature: 120° C.
Molding temperature: 149° C.
Molding time: 1.5 minutes
Initial pressure: 5 bar nitrogen.

A sheet having a shrink-free surface and a glass content of 28.5% was obtained.

Mechanical properties:
density: 1.31 g/cm$^3$
pore volume: 0%
mean cell diameter: 0.02 mm
yield stress [N/mm$^2$], DIN 53,504: 84
tensile strength [N/mm$^2$], DIN 53,504: 150
elongation at break [%], DIN 53,502: 2.5
Shore D hardness, DIN 53,505: 84
flexural stress at maximum deflection [N/mm$^2$], DIN 53,452: 68
notched impact strength [DIN 53,753]
  at +23° C.: 24 kJ/m$^2$
  at −40° C.: 25 kJ/m$^2$
flexural modulus of elasticity [N/mm$^2$], DIN 53,457: 7,600
heat distortion resistance ISO 75$_B$ [°C.]: 200

EXAMPLE 7

The procedure described in Example 1 was followed, using mixture I which comprised 42 parts of a 10% strength solution of a nylon, consisting of 60 parts of an adipic acid/hexamethylenediamine salt and 40 parts of caprolactam and having a K value of 74.6, in caprolactam, 8 parts of a 17.5% strength solution of sodium lactamate in caprolactam and 1 part of a polyether consisting of allyl alcohol/PO/EO and having a molecular weight of 6,000, and mixture II comprised 41.5 parts of a 10% strength solution, in caprolactam, of a nylon copolymer consisting of 1,800 parts of an adipic acid/hexamethylenediamine salt, 129 parts of adipic acid, 60 parts of hexamethylenediamine and 1,011 parts of diamine based on polytetrahydrofuran (molecular weight 1,000), having a K value of 55 and containing 7.9 equivalents/kg of COOH and 266 equivalents/kg of NH$_2$, 8.5 parts of a 17.5% strength solution of hexamethylene diisocyanate in caprolactam and 1 part of a polyether consisting of allyl alcohol/PO/EO and having a molecular weight of 6,000.

Mixing temperature: 125° C.
Molding temperature: 143° C.
Molding time: 2 minutes
Initial pressure: 5 bar nitrogen.

A sheet having a satisfactory surface was obtained.
density: 1.058 g/cm$^3$
pore volume: 8%
mean cell diameter: 0.06 mm
yield stress [N/mm$^2$], DIN 53,504: 70
tensile strength [N/mm$^2$], DIN 53,504: 50
elongation at break [%], DIN 53,504: 25
Shore D hardness, DIN 53,505: 77
flexural stress at maximum deflection [N/mm$^2$], DIN 53,452: 68
notched impact strength [DIN 53,753]
  at +23° C.: 94 kJ/m$^2$
  at −40° C.: 20 k/m$^2$
flexural modulus of elasticity [N/mm$^2$], DIN 53,457: 2,600
heat distortion resistance ISO 74$_B$ [°C.]: 201

EXAMPLE 8

(a) A 10% strength solution of a nylon, consisting of 60 parts by weight of isophthalic acid, 40 parts by weight of terephthalic acid and an equivalent amount of hexamethylenediamine, in caprolactam was prepared. The nylon copolymer had a K value of 55. The solution gelled after standing at 120° C. for 1 hour. However, when 5%, based on nylon, of N,N-dimethylformamide dimethyl acetal was added to the solution of 120° C., the mixture stirred for 1 hour at this temperature and dimethylformamide and methanol removed under reduced pressure, a solution having a long shelf life was obtained.

(b) Sheets were produced as described in Example 1. Mixture I comprised 40 parts of caprolactam,
10 parts of a 17.5% strength solution of sodium lactamate in caprolactam and
1 part of a polyether consisting of allyl alcohol/PO/EO and having a molecular weight of 6,000,
and mixture II comprised
40 parts of the solution of the nylon copolymer in caprolactam prepared as described under (a) and
10 parts of a 17.5% strength solution of hexamethylene diisocyanate in caprolactam.
Mixing temperature: 125° C.
Molding temperature: 143° C.
Molding time: 1 minute
Initial pressure: 3 bar nitrogen.

A sheet having a satisfactory surface was obtained.
density: 1.07 g/cm$^3$
pore volume: 6%
mean cell diameter: 0.05 mm
yield stress [N/mm$^2$], DIN 53,504: 70
tensile strength [N/mm$^2$], DIN 53,504: 65
elongation at break [%], DIN 53,504: 25
Shore D hardness, DIN 53,505: 78
flexural stress at maximum deflection [N/mm$^2$], DIN 53,452: 68
notched impact strength [DIN 53,753]
  at +23° C.: 111 kJ/m$^2$
  at −40° C.: 46 kJ/m$^2$
flexural modulus of elasticity [N/mm$^2$], DIN 53,457: 2,900
heat distortion resistance ISO 75$_B$ [°C.]: 203

EXAMPLE 9

The shelf life of a 12.5% strength by weight solution of the nylons stated in Examples 1, 2, 3, 4, 5 and 7, and the mechanical properties of the end product and the molding time, were substantially improved by reaction with (a) hexamethylene diisocyanate,
(b) methyl lactam carboxylate,
(c) acryloylcaprolactam,
(d) methacryloylcaprolactam,
(e) acetic anhydride,
(f) N,N-dimethyformamide dimethyl acetal or
(g) 1-dimethylamino-1-methoxy-acetonitrile
(h) by direct esterification with monofunctional alcohols, or by reaction with
(i) α-hydroxymethylcaprolactam.

By means of the reactions a to i, the terminal groups of the nylon are blocked, the amino groups are acylated or alkylated and their carboxyl groups are esterified or amidated.

The impact strength was doubled in some cases, and the molding time reduced to half the former value.

EXAMPLE 10

Blocking of a polyether-ester based on terephthalic acid/butanediol/tetrahydrofuran was carried out by reaction with dimethylformamide acetal and by esterification with monofunctional alcohols.

Sheets were produced as in Example 1.
Mixture I comprised
42 parts of caprolactam and
8 parts of a 17.5% strength solution of sodium lactamate in caprolactam,
and mixture II comprised
41.5 parts of a 10% strength solution of a polyetherester based on terephthalic acid/butanediol/polytetrahydrofuran, reacted with 5 parts of dimethylformamide acetal, and
8.5 parts of a 17.5% strength solution of hexamethylene diisocyanate in caprolactam.
Mixing temperature: 130° C.
Molding temperature: 147° C.
Molding time: 1.5 minutes
Initial pressure: 3 bar nitrogen.

A sheet having a smooth surface was obtained.
density: 1.05 g/cm$^3$
pore volume: 7%
mean cell diameter: 0.03 mm
tensile strength [N/mm$^2$], DIN 53,504: 68
elongation at break [%], DIN 53,504: 8
Shore D hardness, DIN 53,505: 78
flexural stress at maximum deflection [N/mm$^2$], DIN 53,452: 65
notched impact strength [DIN 53,753]
  at +23° C.: 15 kJ/m$^2$
  at −40° C.: 6 kJ/m$^2$
flexural modulus of elasticity [N/mm$^2$], DIN 53,457: 2,800
heat distortion resistance ISO 75$_B$ [°C.]: 198

EXAMPLE 11

A mixture I comprising
15 parts of a 30% strength solution, in ε-caprolactam, of a nylon copolymer prepared from 30 parts of ε-caprolactam, 33.24 parts of a dimeric fatty acid (Pripol ® 1010 from Unichema, molecular weight 820, acid number 191), 16.68 parts of adipic acid and 20.10 parts of hexamethylenediamine and having a K value of 69, measured on a 0.5% strength solution in phenol/o-dichlorobenzene,
6.33 parts of ε-caprolactam,
9 parts of a 17.5% strength solution of sodium lactamate in ε-caprolactam,
1.25 parts of carbon black,
0.5 part of a polyether consisting of allyl alcohol/PO/EO and having a molecular weight of 6,000, and
1.25 parts of talc and
a mixture II comprising
35 parts of a 30% strength solution, in ε-caprolactam, of a nylon copolymer prepared from 30 parts of caprolactam, 33,24 parts of a dimeric fatty acid (Pripol ® 1010 from Unichema, molecular weight 820, acid number 191), 16.68 parts of adipic acid and 20.10 parts of hexamethylenediamine (K value 69, 41 meq/kg of NH$_2$ groups and 55 meq/kg of COOH groups, the carboxyl groups having been reacted with a mixture of 2,4- and 2,6-toluene diisocyanate by stirring for 2 hours at 160° C.),
20.56 parts of ε-caprolactam,
8.0 parts of a solution of 60% of ε-caprolactam and 40% of hexamethylene diisocyanate,
1.25 parts of carbon black,
1.25 parts of talc,
0.5 part of a polyether (as above) and
0.1 part of copper(I) iodide/triphenylphosphine/Mn(II)CO$_3$ were laden with nitrogen under an initial pressure of 5 bar, fed to the mixing chamber at 125° C., the ratio of I to II in the mixture being 100:204, and directly thereafter introduced into a closed sheet mold. The mold temperature was 150° C. The molding was removed from the mold after 1 minute. The sheet obtained had a smooth surface and the following mechanical properties:
density: 1.055 g/cm$^3$
pore volume: 3%
mean cell diameter: 0.05 mm
tensile strength [N/mm$^2$]: 60
Shore D hardness, [DIN 53,505]: 80
impact strength [DIN 53,453]
 at +23° C.: 28
 at −40° C.: 14
flexural modulus of elasticity [N/mm$^2$], [DIN 53,457]
 at −30° C.: 3,240
 at +23° C.: 2,430
 at +65° C.: 736
heat distortion resitance, ISO 75$_B$, °C.: 204
increase in length on storage in water for 10 days at 23° C.: 0.3%

EXAMPLE 12

The procedure described in Example 11 was followed.

3 parts of a solution comprising of 50 parts of caprolactam and 50 parts of trimerized hexamethylene diisocyanate having a mean functionality of 3.6 (number average) were also added to mixture II. Components possessing an excellent surface were obtained.

EXAMPLE 13

The procedure described in Example 11 was followed.

0.75 part of calcium stearate was added to mixture I. At the same time, the polyether was omitted from components I and II. 3 parts of a solution consisting of 50 parts of caprolactam and 50 parts of trimerized hexamethylene diisocyanate having a functionality of 3.6 (number average) were also added to mixture II, as described in Example 12. Components having an excellent surface were obtained.

EXAMPLE 14

The procedure described in Example 11 was followed, except that 1 part of a trimesic acid/hexamethylenediamine salt was added, before the polycondensation, to the nylon copolymer employed in Example 11. The nylon copolymer had a K value (0.5% strength in 1:1 phenol/O-dichlorobenzene) of 62. 0.5 part of an antifoam (Byk® A 500 from Mallinckrodt, D-4230 Wesel 1, Germany) was added to component I, and the same amount of this antifoam was added to component II. 3 parts of a solution of 50 parts of caprolactam and 50 parts of trimerized hexamethylene diisocyanate having a functionality of 3.6 (number average) were also added to component II, as described in Examples 12 and 13. Components having an excellent surface were obtained.

EXAMPLE 15

The procedure described in Example 11 was followed, except that 0.2 part of a solution of 50 parts of caprolactam and 50 parts of trimerized hexamethylene diisocyanate having a functionality of 3.6 (number average) was added, before the polycondensation, to the nylon copolymer employed in Example 11. The nylon copolymer had a K value (0.5% strength in 1:1 phenol-/o-dichlorobenzene) of 69. 0.5 part of potassium stearate was added to mixture I. At the same time, the polyether was omitted from components I and II. 3 parts of a solution consisting of 50 parts of caprolactam and 50 parts of trimerized hexamethylene diisocyanate having a functionality of 3.6 (number average) were also added to mixture II, as described in Example 12. Components having an excellent surface were obtained.

EXAMPLE 16

The process conditions used in Example 11 were changed. The initial pressure for component II was 4 bar of nitrogen, while that for component I was 1.5 bar. The composition of the components corresponded to that stated in Example 13, except that 0.2 part of hexamethyldisilane was also added to component II. Components having an excellent surface were obtained.

We claim:

1. A cellular nylon molding having a substantially cell-free skin and prepared by activated alkaline lactam polymerization in a mold, which comprises
(A) 70–99 parts by weight of polycaprolactam,
(B) 1–30 parts by weight of a polyamide selected from the group consisting of an aliphatic polyamide having a melting point of below 200° C. and/or an aromatic-/aliphatic polyamide having a glass transistion temperature of from 100° to 170° C. and having a K value (0.5% strength in 1:1 phenol/o-dichlorobenzene) of from 30 to 75 which is amorphous or contains less than 30% of crystalline components and has a solubility of not less than 5% by weight in caprolactam at 120° C., and
(C) 3 to 100% by volume, based on (A) and (B), of gas-filled cells having a mean diameter of less than 0.2 mm.

2. A nylon molding as set forth in claim 1, which contains, as a polyamide, a nylon composed of
(a) 20–60% by weight of a cyclic lactam of 6 to 12 carbon atoms and/or an α-aminocarboxylic acid of 6 to 20 carbon atoms and
(b) 40–80% by weight of a salt of a dicarboxylic acid of 6 to 14 carbon atoms and/or a dimeric fatty acid of about 36 carbon atoms and aliphatic and/or cycloaliphatic and/or araliphatic diamines.

3. A nylon molding as set forth in claim 1, which contains, as a polyamide, a nylon composed of one or more aliphatic dicarboxylic acids of 4 to 12 carbon atoms and/or aromatic dicarboxylic acids of 8 to 12 carbon atoms and one or more aliphatic and/or cycloaliphatic and/or araliphatic diamines of 4 to 20 carbon atoms and/or a polyether diamine having a molecular weight of from 500 to 5,000.

4. A process for the production of the nylon molding of claim 1, wherein an intimate mixture of a solution of the polyamide in liquid caprolactam and an inert gas is subjected to activated alkaline polymerization in a conventional manner in a mold, in the presence or absence of fillers and/or conventional assistants.

5. The process of claim 4, wherein the polymerization is carried out in the presence of from 0.01 to 5% by weight, based on (A), of an emulsifier.

6. A process for the production of the nylon molding of claim 1, wherein a solution of the polyamide in liquid caprolactam is subjected to activated alkaline polymerization in a mold in a conventional manner in the presence or absence of fillers and/or conventional assistants and prior to the polymerization, an inert gas is dissolved under superatmospheric pressure in (A) or in a solution of (B) in (A).

7. A cellular nylon molding as set forth in claim 1, which has been prepared in a mold heated at 120° to 180° C.

* * * * *